May 28, 1940.  L. A. JOHNSON  2,202,206
FLUID SEAL
Filed Oct. 18, 1937
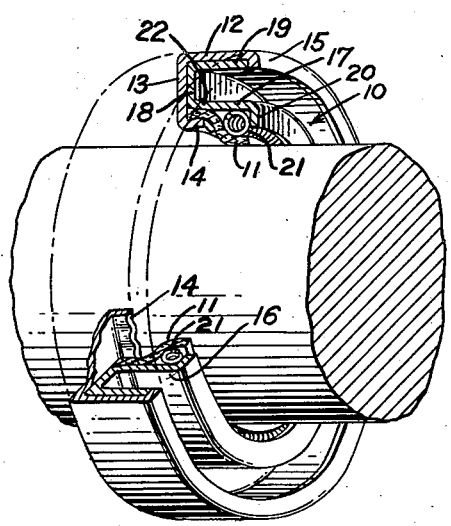
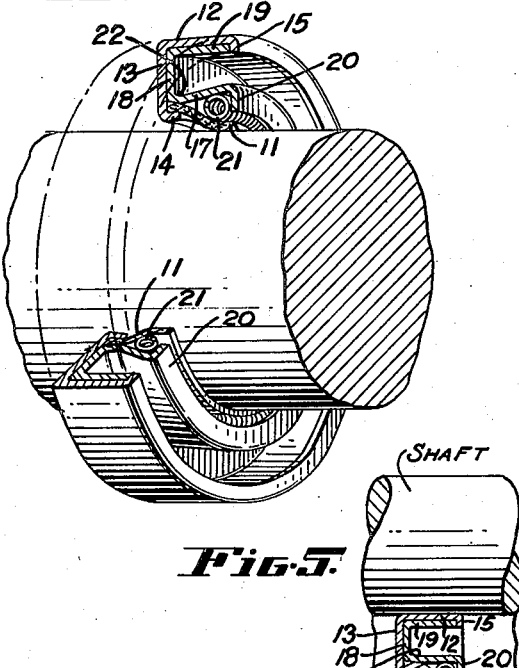
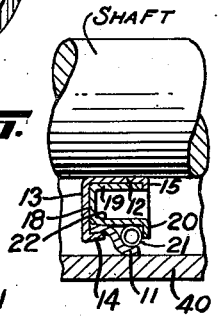
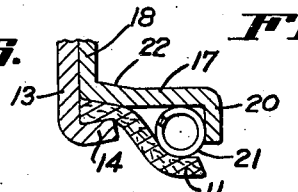
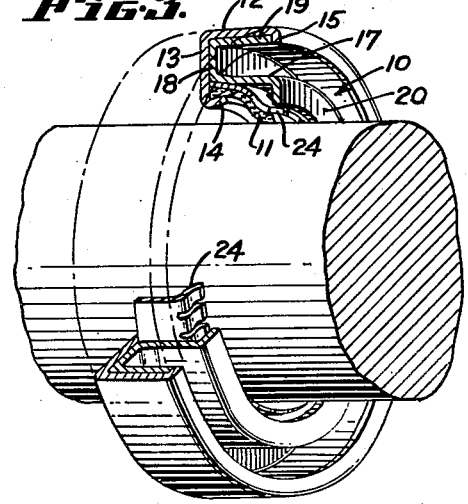
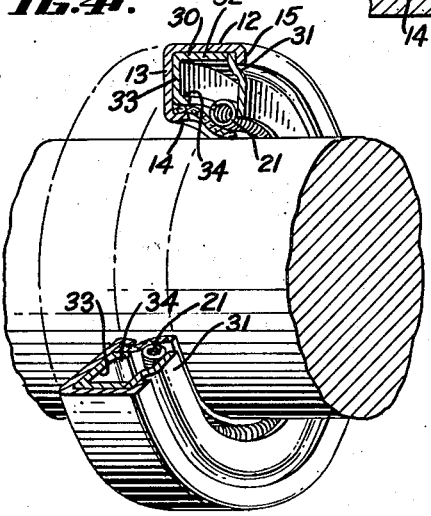
INVENTOR.
LLOYD A. JOHNSON
BY Owen and Hardy
ATTORNEYS.

Patented May 28, 1940

2,202,206

UNITED STATES PATENT OFFICE 2,202,206

FLUID SEAL

Lloyd A. Johnson, Hillsborough, Calif., assignor to National Oil Seal Co., Oakland, Calif., a corporation of Nevada Application October 18, 1937, Serial No. 169,606

2 Claims. (Cl. 288—3)

The present invention relates to fluid seals and more particularly to a fluid seal which is self-contained and which is designed and adapted to be placed around moving shafts or on moving shafts or the like, for the purpose of retaining fluid within a housing from which the shaft projects and preventing the fluid from leaking out along the shaft where seepage normally occurs.

Among other things, it is the object of the present invention to provide a unitary seal structure composed of two stampings arranged so that the flexible sealing member may be clamped between two adjacent axially extending flanges of said stampings; to provide a sealing device employing a minimum amount of leather by clamping the leather adjacent the surface it seals and on its axial portion, thereby eliminating the radial flange; to provide a two-piece cage structure with a tapered peripheral surface adapted for non-rotative fit with one of the faces being sealed, whereby a leak-proof non-rotating union is assured; to provide a seal structure employing metal cage members of a minimum weight and securing the requisite rigidity by means of the shapes of said members; to provide axially extending clamping grooves having means for obtaining a secure leak-proof grip on the axially extending flexible sealing member; and to provide a construction of maximum simplicity, economy and ease of assembly, and such further objects, advantages, and capabilities as will later more fully appear and as are inherently possessed by said device.

An important feature of my invention is the use of a pair of channel shaped cages nesting within each other and securing an axially extending flexible sealing member in a groove formed on the side by a pair of adjacent axial legs of said cages. This accomplishes a sturdy resilient cage structure employing only two stampings and a minimum amount of material in the sealing member since the latter does not have a radial flange.

My invention further resides in the combination construction and arrangement of parts illustrated in the accompanying single sheet of drawings and while there is shown therein a preferred embodiment, together with modifications, it is to be understood that the same are capable of further modification and change and comprehend other details and constructions without departing from the spirit or the scope of the invention.

Referring now to the drawing:

Fig. 1 is a perspective view of a fluid seal with a segment removed exposing a transverse section;

Fig. 2 is a perspective view of a fluid seal showing a modified form, likewise with a segment removed exposing a transverse section;

Fig. 3 is a perspective view of a fluid seal exactly similar to that shown in Fig. 1 except that a finger spring has been substituted for the garter spring. Likewise, a segment has been removed to expose a transverse section;

Fig. 4 is a perspective view of a fluid seal which is a further modification, with a segment removed exposing a transverse section;

Fig. 5 illustrates the seal of Fig. 1 in external form adapted to be secured with the cage in non-rotative fit on the shaft and the flexible element sealing against the bore; and Fig. 6 is an enlarged cross-sectional view of a portion of the device shown in Fig. 1.

It is to be understood that my invention as described herein is as readily suited to use when sealing externally as when sealing internally. Figs. 1 to 4 illustrate internal seals, and Fig. 5 shows an external seal. The parts comprising these two types are the same except for reverse positioning of the several flanges. The invention is claimed so that the broader claims apply equally to external and internal constructions.

Like reference characters are used to designate similar parts in the several views in the drawings and in the description of the invention which follows:

Referring now more particularly to the drawing, the seal is generally designated by the numeral 10. The seal is retained in a non-rotative position in the housing bore by what is commonly known as a press fit. The outside diameter of the cage on an "internal" seal is made several thousandths oversize to provide a drive fit with the bore. An "external" seal has the inside cage diameter made several thousandths undersize to provide a drive fit when inserting it on the shaft. This drive fit of the cage supports and maintains the leather 11 or other suitable sealing means in sealing position around the shaft so as to confine or dam up whatever lubricant or fluid content may be in the housing and prevents it from escaping along the shaft or at the outer periphery of the seal.

Use of the word leather herein is not intended to be limitative, but descriptive of any flexible material, natural or synthetic, having the properties of resiliency, flexibility, non-abrasiveness, non-porosity or substantially so, etc.

The fluid seal as shown in the "internal" form in Fig. 1 includes a metal stamping, substantially circular in shape, having a cylindrical axially extending peripheral flange 12 forming the outer peripheral wall and a spaced shorter axial flange 14 connected by a radially extending portion 13. When assembled, the outer radial portion 15 on flange 12 is spun in in the manner hereinafter described to hold the parts together.

There is also provided an inner metal cage member 16 which may be substantially U-shaped in cross section. This inner cage member has an axial portion 19 preferably nesting snugly against peripheral flange 12 of the outer cage, a radial wall 18 preferably abutting wall 13 of the outer cage, and axially extending wall 17 spaced away from axial flange 14. A flange 20 may be formed on the edge of wall 17 and will function to retain the spring 21 in position. Axially extending wall 17 is also preferably formed with its portion 22 inclined toward axial flange 14 so as to form one side of a substantially dovetail clamping groove. (See Fig. 6.) In certain instances it may prove advantageous to give a wavy contour to axial flange 14 as shown in Fig. 1, or to provide some other irregularities on flange 14 to effect a secure locking of leather 11 in the grove.

The flexible sealing member 11, already mentioned, is of the "channel" or "barrel" type; that is, it is essentially tubular in form and lacks any radial flange portion heretofore so generally employed in fluid seals. One end is securely clamped in the aforementioned dovetail groove which holds it out of contact with the shaft and the other end is held in contact with the shaft by spring 21.

My invention thus provides a novel form of cage structure employing the pair of channel shaped cages nesting within each other to give rigidity with lightness, and provide a circular axially extending clamping groove between adjacent axial flanges. Great simplicity of parts is achieved along with a minimum amount of leather and metal in the parts. Also the assembly is easier than with a one-piece cage, and requires less complicated assembly jigs. Flanges 12 and 19 and flanges 13 and 18 preferably abut so as to give strength to the cage even though relatively light metal is used.

The above assembly describes a construction which is easily adapted to manufacturing requirements and which possesses at the same time the strength of a double wall on the peripheral wall and the radially extending wall. It is apparent from this description that this self-contained unit is perfectly adapted to be seated in a cylindrical housing or circular aperture and preferably in press-fit engagement with the seat. The strength of the double walls is particularly important because of the fact that in many cases hydraulic presses are used to press the seal into the housing aperture to secure a fluid tight peripheral fit.

An added feature of construction is to form radial flange 12 at slightly more than a right angle to radial wall 13. This angle is slight, giving a minute taper to the outside of the cage. The effect of the taper is to make a tight fit in the housing bore and to assure wall 12 conforming to the unevenesses in the bore. It amounts to a cantilever spring action. The taper is also helpful where the seal is to be forced into operating position with only relatively light pressure.

In Fig. 2 the structure is similar to that shown in Fig. 1 and the same reference numerals apply, except that the inner cage member instead of being U-shaped is closed slightly at the open end. This cuts down the clearance between axial flange 14 and the revolving surface of the shaft and permits the use of a flatter sealing member 11. The purpose is to prevent the pressure of the fluid being sealed from forcing the sealing member along the shaft through the clearance space above-mentioned. This structure otherwise is substantially the same as that shown in Fig. 1.

In Fig. 3 there is shown a further modification of the fluid seal shown in Fig. 1 and described above. The coiled circular spring or garter spring 21 has been removed and in its stead for precisely the same function is used a finger spring 24. It comprises a plurality of resilient spring fingers formed integral with a base, the latter being clamped in the axial groove with sealing member 11. The fingers exert inward pressure against the inner surface of the sealing means 11 to hold it in fluid tight engagement against the shaft. In this form of seal the axial wall 17 need not be longer than the axial flange 14, but it is preferred to have it extend as shown in Fig. 3 for the purpose of protecting the edge of sealing member 11.

In Fig. 4 there is shown a still further modification of the present invention which embodies most of the functional characteristics of the seal shown in Fig. 1, and differs only in respect to the inner nesting cage member. Instead of being in one piece it is in two pieces, 30 and 31. Member 30 has the axially extending flange 32 preferably snugly nesting against peripheral flange 12 of the outer cage, a radial wall 33 preferably abutting wall 13 of the outer cage, and axially extending wall 34 spaced away from axial flange 14. Axial wall 34 and flange 14 form the clamping groove in which sealing member 11 is gripped.

Member 31 functions to hold spring 21 on sealing member 11 and to close the end of the seal against entry of any object that would damage the sealing member. It is held in place by rim 15 on the outer cage. This construction, like the one in Fig. 2, can be used where it is especially desired to have as straight a sealing member as possible and small clearance between the shaft and flange 14 for the reason already explained. Also, it lends itself well to installations having a small shaft to bore clearance, into which space must be fitted the complete seal.

In Fig. 5 I have shown a typical external use made of the seal. The construction is identical with that in Fig. 1 except the groove formed by axial flanges 14 and 22, in which the sealing member is clamped is formed on the outside. Necessarily the spring 21 is here of the expanding type to urge leather 11 outwardly against housing bore 40.

It is contemplated that my invention may be embodied in other modified forms and still retain the features set forth in the appended claims.

I claim:

1. A unitary fluid seal adapted for press fit insertion to seal the space between moving parts having cylindrical faces, comprising an outer cage member having an axially extending peripheral flange forming the non-rotative sealing face, a spaced shorter axial flange and a radial wall connecting said flanges, an inner cage member nested in said first cage and having an axial wall underlying said peripheral flange, a radial surface adjacent the aforesaid radial wall and an axial wall spaced from the said shorter axial flange to provide an axially extending annular clamping groove, said last-named wall extending beyond the confines of said groove and having a radial wall portion at its edge pointing away from the peripheral flange, a flexible sealing member extending co-axially with the bore of said cylindrical faces, said axial flexible member being held at one end between the spaced flanges on said nested cages, and resilient means surrounding the free end of said sealing member.

2. A unitary fluid seal adapted for press fit insertion to seal the space between moving parts having cylindrical faces, comprising an outer cage member having an axially extending peripheral flange forming the non-rotative sealing face, a spaced serrated shorter axial flange and a radial wall connecting said flanges, an inner cage member nested in said first cage and having an axial wall underlying said peripheral flange, a radial surface adjacent the aforesaid radial wall and an axial wall spaced from said shorter serrated axial flange to provide an axially extending annular clamping groove, said last-named wall extending beyond the confines of said groove and having a radial wall portion at its edge pointing away from the peripheral flange, a flexible sealing member extending co-axially with the bore of said cylindrical faces, said axial flexible member being held at one end between the spaced flanges on said nested cages, and resilient means surrounding the free end of said sealing member.

LLOYD A. JOHNSON.